United States Patent
Carberry et al.

[19]

[11] Patent Number: 5,881,189
[45] Date of Patent: Mar. 9, 1999

[54] METHOD AND APPARATUS FOR MICROPOSITIONING OPTICAL FIBERS

[75] Inventors: Joel P. Carberry, Horseheads; William J. Miller, Corning, both of N.Y.

[73] Assignee: Corning Incorporated, Corning, N.Y.

[21] Appl. No.: 567,792

[22] Filed: Dec. 5, 1995

[51] Int. Cl.⁶ .................................................. G02B 6/26
[52] U.S. Cl. ............................................................ 385/39
[58] Field of Search .............................. 385/39, 55, 56, 385/59, 61, 63, 65, 83, 71

[56] References Cited

U.S. PATENT DOCUMENTS

| | | | |
|---|---|---|---|
| 4,812,008 | 3/1989 | Tokumaru et al. ......................... | 385/88 |
| 5,009,692 | 4/1991 | Miller et al. .............................. | 65/3.11 |
| 5,594,822 | 1/1997 | Berkey ...................................... | 385/43 |

*Primary Examiner*—Akm E. Ullah
*Attorney, Agent, or Firm*—Edward V. Charbonneau

[57] ABSTRACT

To make an overclad fiber optic coupler, the bare regions of a plurality of optical fibers are positioned within a glass capillary tube. The midregion of the tube is then collapsed and stretched to cause coupling between the fibers. To obtain desirable coupling characteristics, the fibers must be situated in the glass tube bore in side-by-side fashion such that the cross-sectional configuration of the fibers constitutes a given geometrical array. To ensure that the fibers are properly positioned within the glass tube, they are fed to that tube from a plurality of guide tubes, the ends of which are retained adjacent to the end of the glass tube in side-by-side fashion in the given geometrical array.

25 Claims, 5 Drawing Sheets

METHOD AND APPARATUS FOR MICROPOSITIONING OPTICAL FIBERS

BACKGROUND OF THE INVENTION

The present invention relates to a method and apparatus for precisely positioning a plurality of optical fibers, and more particularly, to a method and apparatus for inserting a plurality of optical fibes into the bore of a capillary tube.

A plurality of optical fibers may need to be precisely positioned while manufacturing a device that includes the fibers. To form an overclad fiber optic coupler, for example, the stripped portions of a plurality of fibers are inserted into a capillary tube to form a coupler preform. The midregion of the coupler preform is then heated and collapsed onto the fibers and stretched until the desired coupling characteristics are obtained. The time required for manually inserting fibers into the tube can be a significant portion of the time required to make the coupler. Also, the reproducibility of the coupler manufacturing operation is dependent to some extent upon the positioning of the fibers in the tube.

It is especially difficult to insert the fibers into the capillary tube when making 1×N couplers when $N \leq 6$. See U.S. Pat. No. 5,268,979 for fiber orientations for 1×6 and 1×8 couplers. To make a 1×6 coupler, for example, six fibers are disposed around a central fiber in the coupling region.

It is even more difficult to make multifunction overclad couplers of the type disclosed in U.S. patent application Ser. No. 08/565,542 (D. L. Weidman P00007) filed now U.S. Pat. No. 5,664,037 on even date herewith. Such couplers have two or more tapered coupling regions, as further discussed below in conjunction with FIGS. 9, 10 and 11. In certain 1×N multifunction coupler embodiments, wherein $N \leq 6$, the end of an active fiber having a core and cladding may butt against a dummy fiber that does not propagate light, the junction between the fibers being somewhere between two of the coupling regions. By active fiber is meant an optical fiber having a core and cladding; such a fiber is capable of efficiently propagating light. Active fibers are contrasted with "dummy" fibers that do not contain cores. This relationship is used to prevent two adjacent fibers that have coupled in a first coupling region from coupling in another coupling region. If such coupling did occur, the resultant interference effects would be similar to those that occur in Mach-Zehnder devices, and the output power would vary as a function of wavelength. During the process of making such a coupler, fibers are inserted into the capillary tube bore so that some of the fibers extend entirely through the tube, and some of them are composite fibers consisting of an active fiber and a dummy fiber which abut one another within the tube. If the composite fibers are not made by fusing together the active and dummy fibers, then the device is made by inserting one part of the composite fiber into one end of the tube and another part of the composite fiber into the other end of the tube. Dummy and active fibers need to be precisely positioned at both ends of the tube if they are to become aligned end-to-end.

In accordance with this invention the handling of optical fibers is facilitated by providing a method and apparatus for precisely positioning a plurality of optical fibers relative to a coupler forming apparatus and/or other elements such as capillary tubes that are used in the manufacture of fiber optic devices.

When a coupler preform is formed off-line and thereafter inserted into the coupler draw apparatus, the fiber pigtails extending from the capillary tube are tacked to the ends of the tube so that the bare regions of the fibers remain in the proper position within the tube bore during the coupler preform transfer step. The epoxy that is used to tack the fiber pigtails can have a detrimental effect on the resultant coupler. Such detrimental effect can be avoided by forming the coupler preform while the capillary tube is in the coupler forming apparatus. This procedure would save time since it eliminates the step of transferring the coupler preform from the off-line fiber insertion apparatus to the coupler draw apparatus. A further reduction of coupler production time can be achieved by automatically feeding fiber to the draw apparatus. When forming couplers on-line in the coupler draw apparatus, various fiber modification steps such as coating stripping and fiber end termination are performed at or near the draw apparatus. After such fiber modification steps have been performed on one or more fibers but before those fibers have been inserted into the capillary tube, they can clutter the coupler draw apparatus. Moreover, even after the fibers have been inserted into the capillary tube, the pigtails extending from the capillary tube can clutter and interfere with the coupler draw process. A further feature of the invention is to dispense optical fiber to a coupler draw apparatus in such a manner as to avoid the aforementioned problems.

SUMMARY OF THE INVENTION

One aspect of the invention relates to a method for inserting a plurality of optical fibers into the bore of a glass tube so that the fibers are arranged in the bore in side-by-side fashion such that the cross-sectional configuration of the plurality of fibers constitutes a given geometrical array. A plurality of guide tubes are supported so that the first ends thereof are adjacent the first end of the glass tube. The first ends of the guide tubes, which are retained in side-by-side fashion in the given geometrical array, have a longitudinal axis that is aligned with the longitudinal axis of the bore. A plurality of optical fibers is inserted into the plurality of guide tubes, and the fibers are then moved into the bore of the glass tube.

A further aspect of the invention relates to a method for making a device that includes an optical fiber. The method includes the step of providing at least one guide tube having first and second ends. A first optical fiber is fed into the first end of the guide tube until a portion thereof extends from the second end thereof. Coating is removed from a region of the first optical fiber to form a first bare region. At least a portion of the first optical fiber is then retracted into the guide tube.

The further aspect of the invention is particularly suitable for making fiber optic coupler preforms in which case a plurality of guide tubes is employed. The first ends of the guide tubes are grouped together in side-by-side fashion. The at least one guide tube constitutes a first of the plurality of guide tubes. A second optical fiber is fed into the first end of a second of of the guide tubes until a portion thereof extends from its second end. Coating is removed from a region of the second optical fiber to form a second bare region. The second ends of the guide tubes are positioned adjacent the first end of the glass tube. The first and second optical fibers are fed into the first ends of the guide tubes until the first and second bare regions are situated within the bore of the glass tube.

The apparatus of this invention is adapted for inserting a plurality of optical fibers into the bore of a glass tube so that the fibers are arranged in side-by-side fashion, the cross-sectional configuration of the plurality of fibers constituting a given geometrical array. Tube clamp means supports the glass tube. Means is provided for retaining the first ends of the guide tubes in side-by-side fashion in the given geometrical array. The first ends of the guide tubes are positioned adjacent the first end of the glass tube so that the tube array is sufficiently aligned with the longitudinal axis of the bore that fibers extending from the first ends of the guide tubes can enter the bore. Support means which supports the retaining means is movable along the longitudinal axis of the bore. Means is provided for moving the fibers into the bore at the first end of the tube.

DESCRIPTION OF THE PREFERRED EMBODIMENTS

Figure 1:
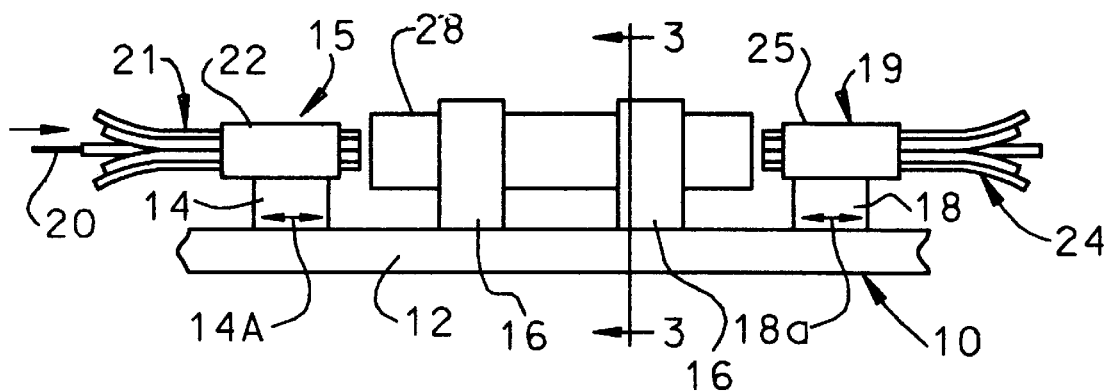
FIG. 1 illustrates an apparatus for inserting optical fibers into a tube.

FIG. 1 shows a fiber insertion apparatus 10 including a table 12 having support brackets 14 and 18 and tube clamps 16 on its upper surface. A glass capillary tube 28 having a longitudinal bore 29 (see FIG. 2) is secured in clamps 16. The ends of the bore are flared at funnels 27 to facilitate fiber insertion. Affixed to brackets 14 and 18 are fiber insertion fixtures 15 and 19, which include a plurality of fiber guide tubes 21 and 24, respectively, that are retained in an appropriate pattern by retaining tubes 22 and 25, respectively. A first end of each of the tubes 21 is located adjacent one end of capillary tube 28, and a first end of each of the tubes 24 is located adjacent the opposite end of tube 28. Tubes 21 and 24 are flexible so that the second ends thereof can be splayed to form a spaced array where the ends of adjacent guide tubes may be separated by a sufficient distance that fiber insertion is convenient. The spaced array of guide tube ends can exhibit various geometries, some of which are described below.

Figure 3:
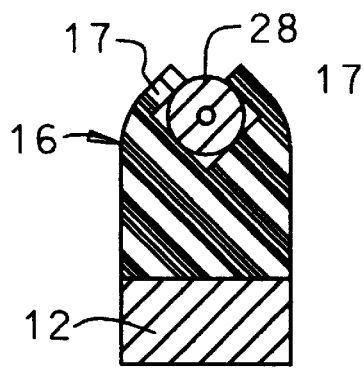
FIG. 3 is a cross-sectional view taken along lines 3—3 of FIG. 1.

When tube 28 is inserted into clamps 16, its ends are properly aligned with fixtures 15 and 19. As shown in FIG. 3, each of the clamps 16 may consist of a body of resilient material having projections 17 which temporarily deflect outwardly to receive tube 28 as it is pushed downwardly through the opening between the two projections 17. Other types of clamps such as spring operated clamps could also be used. Coated fiber 20 is illustrated as being inserted into one of the fiber guide tubes 21.

Figure 2:
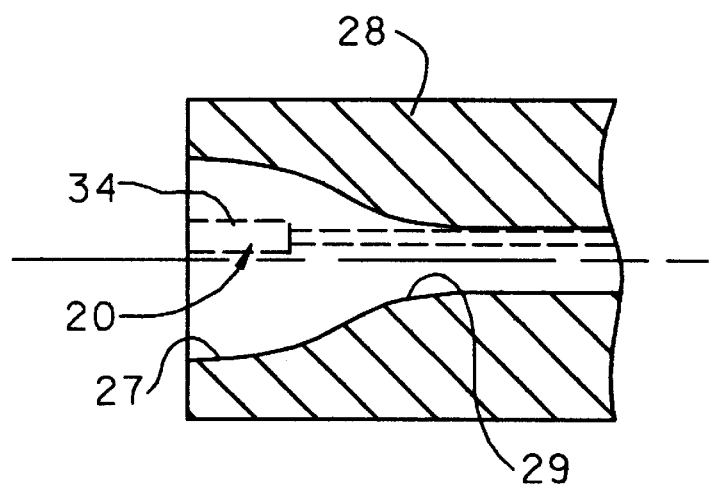
FIG. 2 is a partial cross-sectional view illustrating a portion of the apparatus of FIG. 1.
Figure 4:
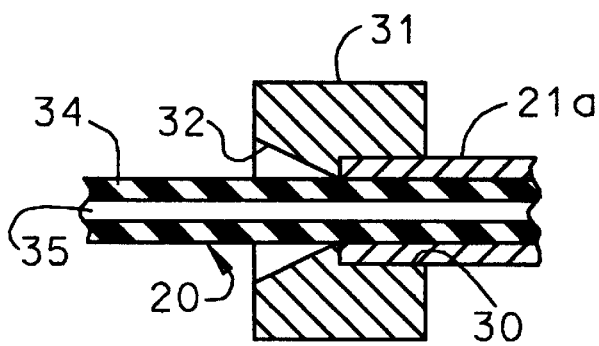
FIGS. 4 and 5 are cross-sectional views of the fiber insertion ends of fiber guide tubes.
Figure 5:
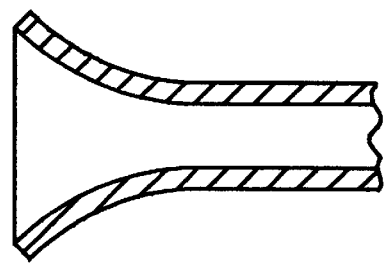

As shown in greater detail in FIG. 2, fixture 15 consists of an array of seven flexible tubes 21a–21g in a six-around-one configuration at its end nearest tube 28. This embodiment can be realized by arranging tubes 21a through 21g inside a larger tube 22 of an appropriate inside diameter (three times the outside diameter of the smaller tubes) to hold them in that pattern. Alternatively, tubes 21a through 21g could be glued together. Stainless steel has been found to be a particularly suitable material for both tube 22 and tubes 21. To facilitate fiber insertion, those ends of the tubes remote from the coupler can be provided with appropriately shaped end fittings (FIG. 4), or they can be flared (FIG. 5). The end of the fiber guide tube 21a shown in FIG. 4 is situated within bore 30 of end fitting 31. Axially adjacent bore 30 is a flared opening or funnel 32 through which coated fiber 20 can be inserted. The coated fiber includes a glass fiber 35 surrounded by a protective coating 34.

That portion of the fiber that is situated within capillary tube 28 during the coupler fabrication process must be bare so that the coating material does not burn and ruin the resultant coupler. The stripped region is usually an end region or a region at the center of the fiber. Coating material can be removed from the appropriate region of fiber 20 prior to inserting it into tube 21a. Alternatively, a sufficient length fiber can be fed through the fiber guide tube that the region to be stripped extends from the guide tube. The coating can be removed manually or by automated equipment such as that disclosed in U.S. patent application Ser. No. 08/444,983 (Miller 14A) filed May 19, 1995. After the coating is stripped therefrom, the fiber can be retracted into the guide tube until all or most of the fiber is in the guide tube. Thus, for example, the fibers could be arranged in the guide tube so that only the bare ends thereof extend from the guide tube. Those bare ends could then be simultaneously delivered to the bore of capillary tube 28.

Figure 6:
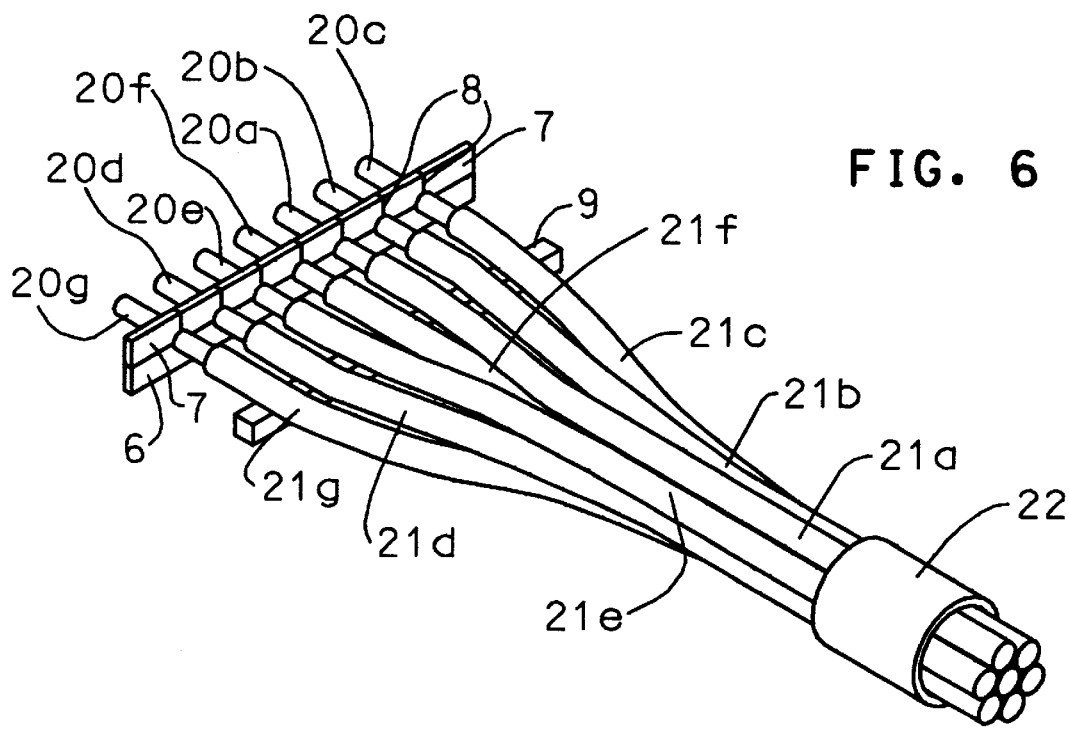
FIG. 6 is an oblique view of a fiber insertion apparatus in which the ends of the fiber guide tubes opposite the capillary tube are arranged in a linear array.

FIG. 6 shows that those ends of fiber guide tubes 21a through 21g that are opposite capillary tube 28 can be arranged in a linear array. Such a linear array lends itself to operation with automated fiber feeding apparatus of the type described below. The ends of guide tubes 21 opposite retaining tube 22 are affixed to a support member 9 such that they are arranged in the desired linear array. Tubes 21 could be in contact with one another or slightly separated. Adjacent support member 9 is a base member 6 on which a strip of soft, resilient material 7 is situated. Strip 7 could be formed of foam rubber, for example. Strip 7 is provided with a plurality of slots 8 that are aligned with tubes 21. Each of the fibers 20a through 20g is inserted into a respective end of one of the tubes 21a through 21g and is then pushed downwardly into a respective slot 8 which restrains it from further movement. Each of the elements 6, 9 and 22 can be affixed to the same movable base such as base 14 of FIG. 1.

It is noted that the drawings are not to scale. In one embodiment, tubes 21 were 30 cm long, and the distance between the ends of tubes 21 and strip 7 varied from 5.5 to 8.5 cm.

If a single taper coupler (see U.S. Pat. No. 5,268,979, for example) is to be formed, only one of the fiber insertion fixtures 15 and 19 need be employed. To make a one type of 1×6 coupler, coating material is stripped from the ends of all seven of the optical fibers. Six of the fibers are fed through the outer six guide tubes 21a through 21f until the stripped ends extend from the ends of the guide tubes adjacent capillary tube 28. The stripped end of the seventh fiber is inserted through the capillary tube until it extends into the array of six stripped fibers extending from the fiber insertion fixture. The seventh fiber could be aligned with the longitudinal axis of bore 29 by placing it in a V-groove that is aligned with that axis or by placing it in a fiber guide tube that is aligned with that axis. Then, all seven fibers are simultaneously traversed toward the capillary tube and into its bore until they are properly positioned. At this time the coatings of six of the fibers extend into one of the funnels 27 (note the position of fiber 20 in FIG. 2), and the coating of the seventh fiber extends into the opposite funnel 27. If desired, epoxy can be applied to both ends of the capillary tube to tack the fiber coatings to the tube ends. Fixture 15 is retracted from capillary tube 28. Tube 28 is removed from clamps 16 and the six fibers 20a through 20g are pulled through their respective guide tubes. The resultant coupler preform is then inserted into a coupler drawing apparatus where the tube is collapsed onto the fibers and is stretched to provide a coupler having the desired coupling characteristics.

Figure 7:
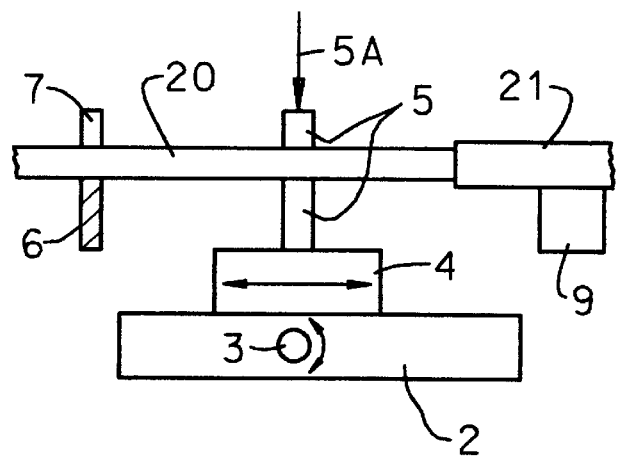
FIG. 7 illustrates a modification of the apparatus of FIG. 6.

FIG. 1 shows that the entire fixture 15 can be moved toward tube 28 to insert fibers into the tube bore. In the modification shown in FIG. 7, the fixture 15 remains fixed with respect to tube 28, and only the fibers are moved toward tube 28. In FIG. 7, fiber 20 is shown extending from tube 21 which is fixed to support member 9. As previously described, the ends of the fibers can be positioned in the slots of resilient strip 7. The ends of guide tubes 21 that are secured in tube 22 are moved axially with respect to tube 28 so that the distance between tube 28 and tubes 21 is about the length of a stripped section of fiber. After the fibers are inserted into tubes 21 with the stripped ends of all of the fibers being properly positioned adjacent the end of tube 28, all of the fibers are engaged by clamp 5. Clamp 5 is mounted on a micromanipulator table 4 that is movably mounted on base 2. When shaft 3 is rotated, table 4 and thus clamps 5 can be slowly traversed toward tubes 21. This causes the fibers to simultaneously traverse through tubes 21 whereby the stripped ends become positioned in bore 29.

Figure 8:
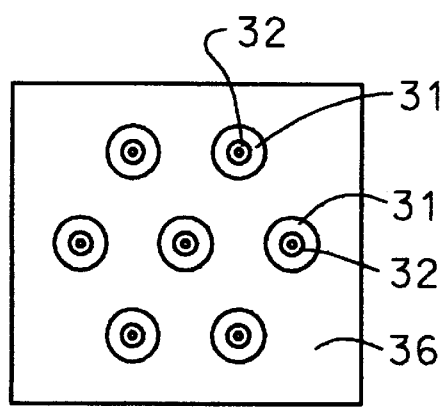
FIG. 8 shows a circular arrangement of end fittings that are adapted for connection to the ends of the fiber guide tubes opposite the capillary tube.

Whereas FIG. 6 shows that the remote ends of the guide tubes can be situated in a linear array, FIG. 8 shows that the remote guide tube ends can be arranged in the same type of array as the ends thereof that are adjacent tube 28. FIG. 8 shows one side of a support plate 36 having bores (not shown) into which seven end fittings 31 are affixed. End fittings 31 are arranged in the same array as the ends of the guide tubes that are adjacent the end of tube 28. Fittings 31 are arranged in a six-around-one array that matches the array of guide tubes shown in FIG. 2. The separation between adjacent fittings 31 is sufficient to facilitate insertion of fibers into funnels 32.

A fiber insertion apparatus employing two insertion fixtures is required for making certain types of multiple taper coupling devices such as those disclosed in the aforementioned Weidman 14 patent application. Such a multiple taper coupler utilizes both active and dummy fibers.

Figure 9:
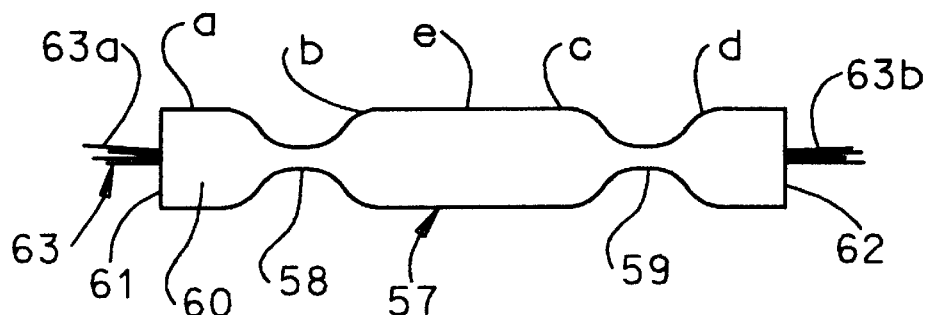
FIG. 9 is a side elevational view of a multi-taper fiber optic coupler.

The multiple taper device 57 of FIG. 9 is formed of an elongated body 60 of matrix glass. A plurality of fibers 63 extend through body 60, which includes two tapered regions 58 and 59. Device 57 is formed by inserting fibers 63 into the bore of a glass capillary tube, and heating and evacuating the tube to collapse it onto the fibers. The tube could be collapsed over the entire region between points a and d. The tube is again heated between points a and b, and it is drawn down or stretched to that diameter and coupling length which is necessary to obtain the desired coupling properties. Thereafter, the heating and stretching step is performed between points c and d.

Figure 10:
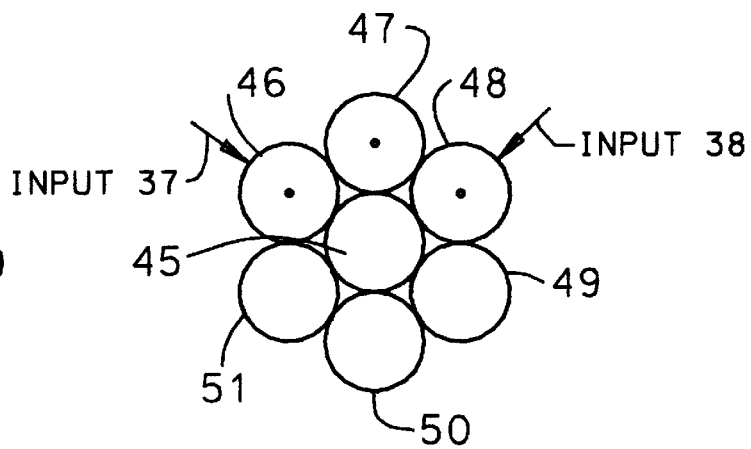
FIGS. 10 and 11 schematically illustrate the arrangement of fibers in the first and second coupling regions, respectively, of FIG. 8 to provide a 2×4 coupler function.
Figure 11:
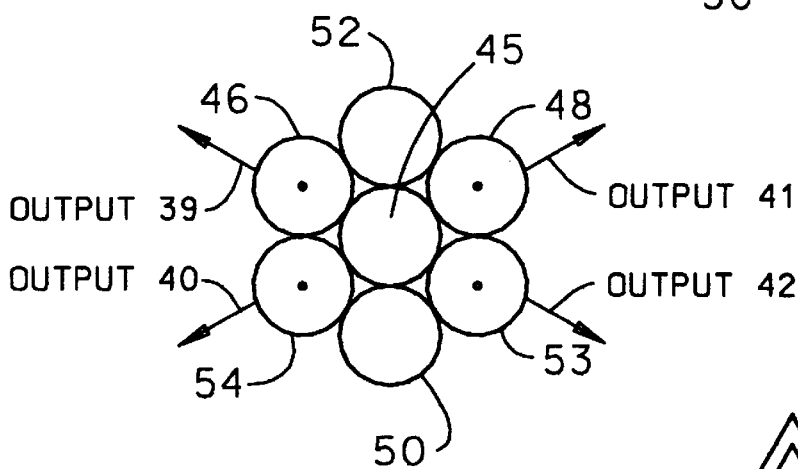

To make a 2×4 coupler, for example, the fibers in tapered coupling region 58 would be arranged as shown in FIG. 10, and the fibers in tapered coupling region 59 would be arranged as shown in FIG. 11. The fibers shown in FIG. 10 extend from point e of the matrix glass through region 58 and out of tube end 61 as indicated by numeral 63a. The fibers shown in FIG. 11 extend from point e of the matrix glass through region 59 and out of end 62 as indicated by numeral 63b. If desired, those fibers that are not used as inputs or outputs can be terminated at or near the ends of the coupler.

In both tapered regions of the 2×4 coupler, the fibers are arranged in a seven fiber close packed array in which six fibers are arranged around a central dummy fiber 45, and all fibers have the same diameter. In taper 58, the two input signals 37 and 38 are applied to identical fibers 46 and 48, respectively, of a 3-fiber linear coupler that also includes fiber 47. There is a propagation constant difference *$ between fiber 47 and each of the fibers 46 and 48. The value of *$ is chosen so that at a particular coupling length, one half of the power input into fiber 46 is coupled to fiber 48. Substantially no power remains in fiber 47 of FIG. 10. The coupler formed by tapered region 58 is symmetric in that half of the power input into fiber 48 is coupled to fiber 46.

Between the tapers, fiber sections 47, 49, and 51 are terminated whereby, in the region of point e of FIG. 9, active fiber section 47 abuts dummy fiber 52, and dummy fiber sections 49 and 51 abut active fiber sections 53 and 54, respectively. Active fibers 46 and 48 are continuous throughout the entire device; at point e they become the input fibers for two optically separated 1×couplers of tapered region 59. Thus, the device outputs 39, 41, 42 and 40 appear on fibers 46, 48, 53 and 54, respectively. Fiber 50 and the central fiber 45 are continuous dummy fibers.

Figure 12:
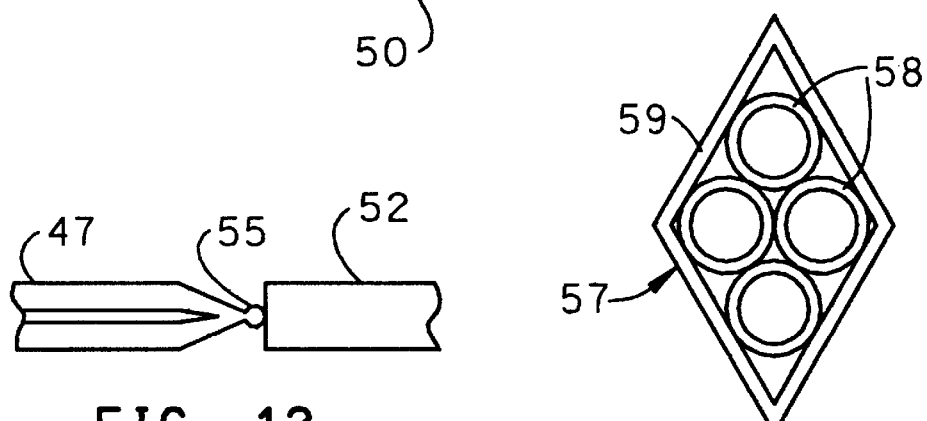
FIG. 12 shows a fiber junction including an optical fiber having a low reflection termination.

Active fibers 47, 53 and 54 are preferably terminated with low-reflection terminations of the type shown in FIG. 12. Such low reflection terminations can be formed by the method disclosed in U.S. Pat. No. 4,979,972. Dummy fiber 52 is shown abutting the terminated end of active fiber 47. The junction between these two fiber is located in the region of point e in FIG. 9.

In order to form the multi-taper coupling device having the fiber arrangements illustrated in FIGS. 10 and 11, fixtures 15 and 19 may both be needed to form the coupler preform. During the fabrication of the coupler preform that is needed to make the device of FIGS. 9–11, fibers 45, 46, 48 and 50 are through fibers that include two pigtail sections connected by a bare region. Because of the need to maintain the fibers in a substantially parallel array within glass tube 28 during the collapse step, it is desirable to employ a glass tube having a relatively small bore 29. If such a tube is employed, the through fibers are inserted sequentially into the bore. The first fiber is inserted through the bore until the bare region is centered as shown in FIG. 2, the beginning of the coated regions being in the funnels where there is sufficient room to accommodate them. Thereafter, the second, third and forth through fibers are sequentially inserted. If desired, the fiber sections that terminate in the midregion of the glass tube can be simultaneously inserted.

When fixtures 15 and 19 are both be needed to form the coupler preform, some provision must be made for removing the coupler preform from the fiber insertion apparatus after the fiber insertion step is completed. Bracket 14 and/or bracket 18 can be slidably mounted (see arrows 14a and 18a) on table 12 by means of tracks, grooves or the like (not shown). After the coupler preform is made, one or both of the fixtures 15 and 19 is axially withdrawn a sufficient distance from tube 28 to permit tube 28 to be removed from the apparatus without damaging the fibers extending therefrom.

As previously stated, only fixture 15, for example, is needed to feed fibers to tube 28 in order to form some single taper couplers. After the fibers are threaded through tube 28, the entire assembly of fibers and tube 28 can be released from clamps 16 and withdrawn away from fixture 15. Those portions of the fibers that had been situated within fiber guide tubes 21 are thus withdrawn from those tubes. If continuous lengths of fibers are supplied to tubes 21 from reels of fiber, sufficient lengths of fiber are withdrawn from tubes 21 to function as fiber pigtails, and the fibers are then severed. The resultant coupler preform (the composite of tube 28 and the fibers) is then inserted into a coupler draw apparatus where the tube collapse and taper steps are performed.

Figure 13:
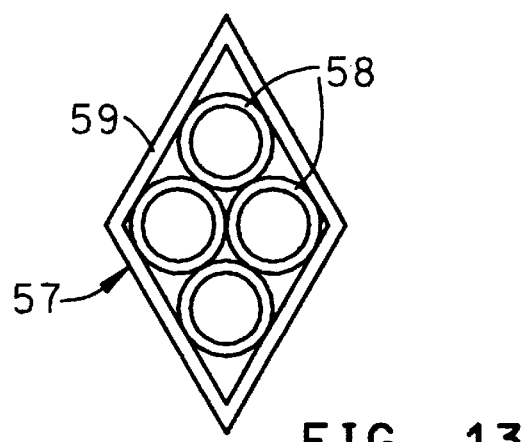
FIG. 13 illustrates a diamond-shaped arrangement of fiber guide tubes.

The arrangement of fibers in the fiber insertion fixture depends upon the number and the geometrical arrangement of fibers in the tube. Fixture 57 of FIG. 13 comprises four fiber guide tubes 58 confined to a diamond-shaped array by retaining device 59. Such a fixture could be used to feed four fibers into a capillary tube having a diamond-shaped bore.

Figure 14:
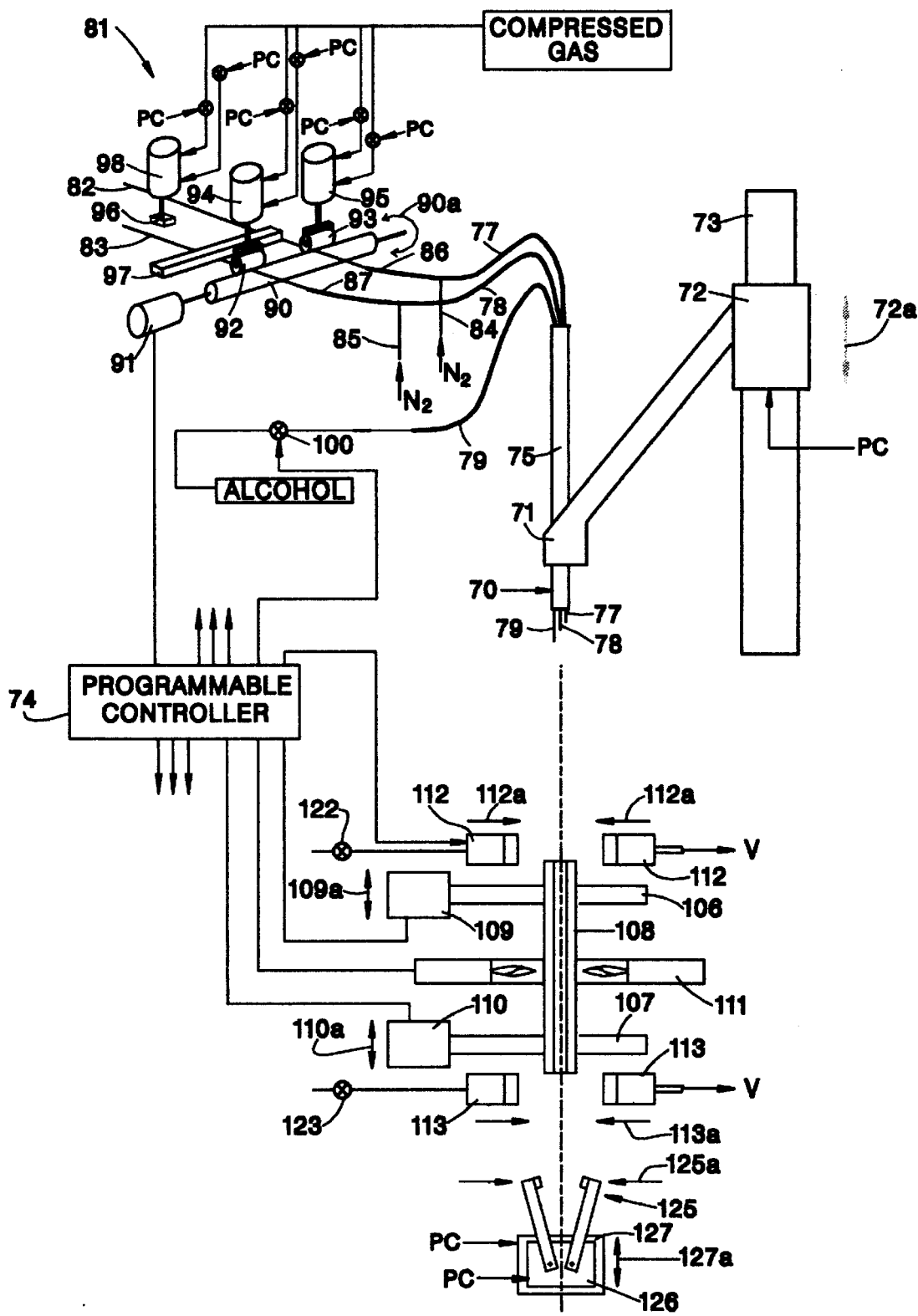
FIG. 14 shows an apparatus for feeding fibers to a coupler forming apparatus.
Figure 15:
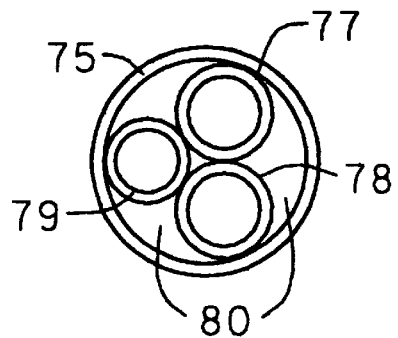
FIG. 15 is an end view of the retaining tube of FIG. 14.
Figure 16:
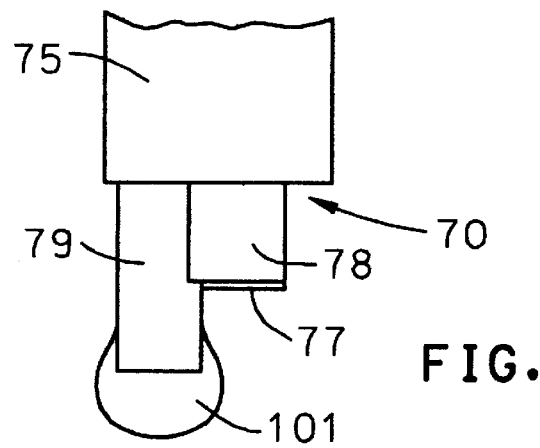
FIG. 16 is a detailed view of the end of the retaining tube of FIG. 14.

In the embodiment shown in FIGS. 14–17 fiber insertion fixture 70 is affixed to one end of a support arm 71, the other end of which is connected to a stage 72 which is movable along track 73 as indicated by arrow 72a. The vertical position of stage 72 is determined by programmable controller 74. For the sake of simplicity, most of the elements of FIG. 14 that are controlled by controller 74 are provided with an arrow marked PC. Fixture 70 includes a retaining tube 75 in which are disposed fiber guide tubes 77 and 78 and alcohol dispensing tube 79. Tubes 77, 78 and 79 are secured to the end of tube 75 by epoxy 80 (FIG. 15).

The end of each fiber guide tube 77 and 78 remote from arm 71 is positioned adjacent fiber feed mechanism 81. Fiber reels (not shown) are non-rotatably positioned so that fibers 82 and 83 that are coiled thereon pay out to feed mechanism 81. The fixed end of each coiled fiber is connected to a detector in a measurement system (not shown). Fibers 82 and 83 pass through the feed mechanism and into guide tubes 77 and 78, respectively. Nitrogen is fed through tubes 84 and 85 into fiber guide tubes 77 and 78, respectively. Nitrogen exiting ends 86 and 87 of guide tubes of 77 and 78, respectively, blow dust and debris from fibers 82 and 83 before they enter the guide tubes. Nitrogen which flows through guide tubes 77 and 78 to the ends thereof adjacent arm 71 lowers the friction between the guide tubes and the fibers as they traverse the guide tubes.

Fiber feed mechanism 81 includes a roller 90 which can be rotated in either direction by a stepping motor 91. Located above roller 90 are idler rollers 92 and 93 which are actuated by gas operated cyclinders 94 and 95. Rollers 92 and 93 are normally biased away from roller 90 by feeding gas through PC-controlled valves to the lower ends of cylinders 94 and 95. By PC-controlled is meant that the valves are under the control of the programmable controller. Alternatively, means such as a spring could bias the rollers 92 and 93 away from roller 90, and they could be actuated against roller 90 by supplying compressed gas to cylinders 94 and 95. To deliver fiber 83 to tube 78, cyclinder 94 is actuated, thereby lowering roller 92 onto roller 90. Motor 91 turns roller 90 in the clockwise direction of arrow 90a. When a sufficient amount of fiber has been delivered, idler roller 92 retracts from main roller 90, and cylinder 98 is actuated to lower clamp 96 against bar 97 to prevent further movement of the fiber. During the time that fiber 83 is being delivered, a position holding clamp (not shown) can clamp fiber 82 against bar 97 to prevent its movement. During the delivery of fiber 83 to guide tube 78, a PC-controlled valve supplies compressed air to the lower inlet to cylinder 98 to retract clamp 96 from bar 97. After a sufficient length of fiber 83 has been delivered to guide tube 78, cylinder 98 can be actuated to cause position holding clamp 96 to clamp fiber 83 to bar 97.

The surfaces of rollers 90, 92 and 93 and the surfaces of clamp 96 and bar 97 that contact the fibers can be coated with a resilient material to avoid damaging the fibers.

Alcohol from a pressurized source is fed to tube 79 by way of valve 100. A drop 101 of alcohol is shown in FIG. 15 extending from guide tube 79.

A coupler drawing apparatus 105 is located below fiber insertion fixture 70. Apparatus 105 includes chucks 106 and 107 which support a capillary tube 108. Chucks 106 and 107 are connected to stages 109 and 110, respectively, each of which is movable in an upward or downward direction as indicated by arrows 109a and 110a. After fibers have been inserted into tube 108, vacuum seals 112 and 113 move in the direction indicated by arrows 112a and 113a to seal the ends of tube 108 within the evacuated cavity.

Figure 17:
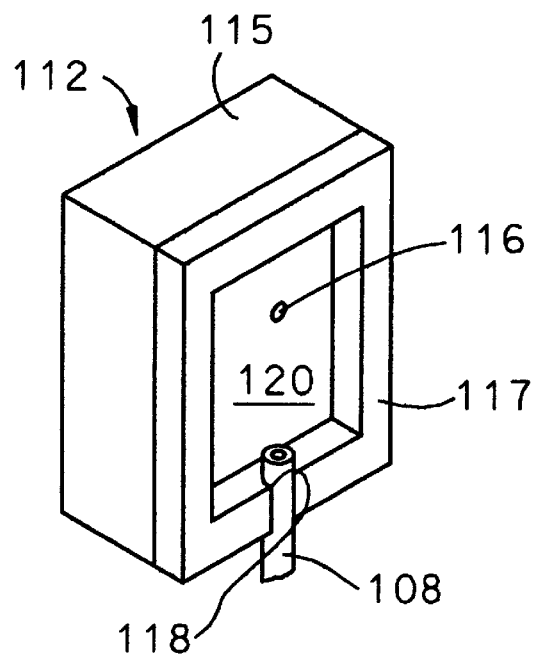
FIG. 17 is an isometric view of a vacuum seal employed in the apparatus of FIG. 14.

The upper left vacuum seal 112 is shown in FIG. 17. It consists of a metal back plate 115 having a bore 116 therein which is adapted to be connected to a bleed valve 122. Surrounding the periphery of the face of back plate 115 is an elastomeric seal 117 of having a semi-cylindrical slot 118 therein which is adapted to receive the end of capillary tube 108. The central portion of seal 117 is hollow so that is forms, along with the face of back plate 115, a cavity 120. The bore 116 of the upper left vacuum seal is connected to a bleed valve 122 (FIG. 14), and that of the upper right vacuum seal is connected to a vacuum source V. Similary, one of the vacuum seals 113 is connected to a vacuum source V, and the other vacuum seal 113 is connected to bleed valve 123.

The apparatus of FIG. 14 can be utilized [in the following manner] to form a 1×2 fiber optic couper.

A length of fiber 83 sufficient to form a stripped, ball terminated end is delivered from fiber guide tube 78. The end of fiber 83 can be stripped by directing hot inert gas against the region to be stripped in accordance with the teachings of U.S. patent application Ser. No. 08/444,983. A low reflectance ball termination is then formed on the end of the fiber by U.S. Pat. No. 4,979,972. The stripped, terminated end of fiber 83 is retracted into guide tube 78.

A sufficient amount of fiber 82 is delivered from fiber guide tube 79 to provide a stripped region slightly shorter than the length of tube 108 about 2 m from the end of the fiber. Also, about three inches (7.6 cm) of coating material is-stripped from the end of fiber 82. The hot inert gas fiber stripping technique discussed above can be employed. Fiber 82 is retracted into guide tube 77 except for about ¼ inch (0.6 cm).

Retaining tube 75 is moved downwardly until the end of fiber 82 goes into the bore of capillary tube 108. Fiber 82 is fed through tube 108 until the bottom of the bare midregion is located just above tube 108. Drops of ethyl alcohol are fed from guide tube 79 to the bore of tube 108 while fiber 82 is being fed therethrough. Retaining tube 75 then moves upwardly (away from tube 108), and fiber 82 is delivered at the same speed so there is no relative movement between the fiber and tube 108. Fiber delivery and retaining tube movement discontinue when the bare midregion of fiber 82 is fully exposed.

The end of fiber 82 that had been stripped is cleaved and inserted into a cam splice assembly tool to temporarily connect it to a light source in the measurement system.

Fiber 83 is fed from guide tube 78 until its stripped end region is situated adjacent the stripped midregion of fiber 82. A bottom clamp 125 is situated on a stage 127 that moves vertically as shown by arrow 127a. Clamp 125, which is actuated by mechanism 126, closes on that portion of fiber 82 extending from the bottom of tube 108. The bottom clamp and retaining tube 75 move downwardly at the same rate. Drops of alcohol are fed from guide tube 79 as the stripped regions of fibers 82 and 83 are simultaneously lowered into capillary tube 108. After the bare regions of both fibers are located in the bore of tube 108, bottom vacuum seal 113 is closed, and alcohol is evacuated from the bore of tube 108. Air is pulled through the tube bore for about 20 seconds. Air is also bled into the left vacuum seal 113 through valve 123. During the vacuum purge of alcohol, an optical reference measurement is made.

The retaining tube 75 is raised, and the fibers 82 and 83 are fed through tubes 77 and 78 at the same rate until the bottoms of tubes 77, 78 and 79 clear the top vacuum seal 112. The top vacuum seal is closed and a vacuum is pulled within the vacuum cavity above the top of tube 108. Air is bled through valve 122 and into left vacuum seal 112 while the other side of the seal is evacauated. This generates a fast moving air stream that removes any alcohol that has accumulated on the top of tube 108. This aspirator action occurs not only during alcohol removal but also during the application of vacuum during the subsequent steps of tube collapse and stretch; it is noted that only a low level of vacuum is required for these two steps.

Burner 111 is preferably a split burner that can close over tube 108 at the appropriate time in the fiber fabrication process. With methane and a reduced level of oxygen flowing, the burner halves are ignited and move in and close around tube 108. Then the flow of oxygen is increased, and the midregion of tube 108 is heated to a sufficiently high temperature to cause it to collapse onto the fibers. About 15–30 seconds later (typically 22 seconds), the top and bottom chucks are traversed in opposite directions and a tapered region is formed. If additional pulls are required, the start of the chuck traverse typically begins about 2–10 seconds after the flame has been ignited.

The vacuum seals are opened, and epoxy is dispensed at the ends of the coupler. UV light is directed at the applied epoxy to cure it.

When coupler is sufficiently cool (30–45 sec) the optical measurement is made.

The coupler body is released from the draw chucks, and the fiber pigtails at the top of the coupler are metered out by the fiber feed mechanism until about 2 m of fiber extends from the top end of the coupler. The output leads are then severed, and the coupler is removed from the draw apparatus.

Some or all of the functions that are indicated as being under the control of the programmable computer may be manually performed by utilizing electrical switches.

The automated fiber insertion apparatus of FIG. 14 is not limited to the type of fiber insertion fixture shown in FIGS. 14 and 15. Such an apparatus could also employ fixtures of the type shown in FIG. 2 as well as fixtures containing more than seven fiber guide tubes to form 1×6 couplers, 1×8 couplers and the like.

I claim:

1. A method for inserting a plurality of optical fibers into the bore of a glass tube so that said optical fibers are arranged in said bore in side-by-side fashion such that the cross-sectional configuration of said plurality of optical fibers constitutes a given geometrical array, said glass tube having first and second ends, said bore having a longitudinal axis, said method comprising the steps of supporting said glass tube, supporting a plurality of guide tubes so that the first ends thereof are adjacent the first end of said glass tube, the first ends of said guide tubes being retained in side-by-side fashion in said given geometrical array, the first ends of said guide tubes having a longitudinal axis that is aligned with the longitudinal axis of said bore, inserting into said plurality of guide tubes a plurality of optical fibers, each of which has a bare region, and moving said optical fibers toward said glass tube until the bare regions thereof extend within the bore of said glass tube.

2. A method in accordance with claim 1 wherein the step of moving comprises holding the position of said guide tubes in fixed relationship with respect to said glass tube and moving said optical fibers through said guide tubes.

3. A method in accordance with claim 1 wherein the step of moving comprises holding the position of said optical fibers in fixed relationship with respect to said guide tubes and moving said guide tubes toward said glass tube.

4. A method in accordance with claim 1 wherein the second ends of said guide tubes are disposed in a geometrical array having a cross-sectional configuration different from said given cross-sectional configuration.

5. A method in accordance with claim 4 wherein the second ends of said guide tubes are disposed in a linear array.

6. A method in accordance with claim 1 wherein the second ends of said guide tubes are disposed in an array having said given cross-sectional configuration, the spacings between adjacent guide tubes at the second ends of said guide tubes being greater than the spacings between adjacent guide tubes at the first ends of said guide tubes.

7. A method in accordance with claim 1 further comprising the step of flowing a gas through said guide tubes.

8. A method in accordance with claim 1 further comprising the step of inserting at least one optical fiber into the second end of said glass tube.

9. A method in accordance with claim 1 further comprising the step of inserting at a single optical fiber into the second end of said glass tube along the longitudinal axis of said bore.

10. A method in accordance with claim 1 wherein said plurality of optical fibers are simultaneously inserted into said glass tube.

11. A method in accordance with claim 1 wherein the bare region of a first of said fibers is in the central region thereof, and wherein the step of inserting comprises inserting said first fiber alone into said bore until the bare region thereof extends within said bore.

12. A method for positioning at least one optical fiber in preparation of making a fiber optic coupler, said method comprising providing a plurality of guide tubes, each having first and second ends, the first ends of said guide tubes being grouped together in side-by-side fashion, that includes at least a first coated optical fiber, feeding said first coated optical fiber into the first end of said at least one guide tube until a portion thereof extends from the second end of said guide tube, removing coating material from an end region of said first coated optical fiber to form a first bare region, retracting at least a portion of said first optical fiber into said at least one guide tube, feeding a second optical fiber into the first end of a second of said guide tubes until a portion thereof extends from the second end of said second guide tube, removing coating from a region of said second optical fiber to form a second bare region, positioning said second ends of said guide tubes adjacent said first end of said glass tube, and feeding said first and second optical fibers into the first ends of said guide tubes until said first and second bare regions are situated within said bore.

13. A method in accordance with claim 12 wherein said first fiber is completely retracted into said first guide tube after the step of removing coating from said first fiber.

14. A method in accordance with claim 12 wherein said first fiber is not completely retracted into said first guide tube after the step of removing coating from said first fiber.

15. A method in accordance with claim 12 wherein, during the step of feeding a first optical fiber, said second end of said guide tube is at a first position, said method further comprising the step of moving said guide tube to a position, and thereafter, feeding said first optical fiber from the second end of said guide tube.

16. An apparatus for inserting a plurality of optical fibers into the bore of a glass tube so that said fibers are arranged in side-by-side fashion, the cross-sectional configuration of said plurality of fibers constituting a given geometrical array, said glass tube having first and second ends, said bore having a longitudinal axis, said apparatus comprising tube clamp means for holding said tube, a plurality of guide tubes, each of said guide tubes having first and second ends, means for retaining the first ends of said guide tubes in side-by-side fashion in said given geometrical array, means for positioning the first ends of said guide tubes adjacent said first end of said glass tube so that said tube array is sufficiently aligned with said bore longitudinal axis that fibers extending from the first ends of said guide tubes enter said bore, means for supporting said retaining means, said support means being movable along said bore longitudinal axis, and means for moving said fibers into said bore at the first end of said tube.

17. Apparatus in accordance with claim 16, further comprising means at the second end of said tube for clamping a fiber that extends from said tube and for pulling said fiber away from said tube.

18. Apparatus in accordance with claim 16 wherein said means for moving said fibers comprises means for moving one of said fibers into said bore while the remaining fibers and said guide tubes remain in fixed relationship with respect to said tube.

19. Apparatus in accordance with claim 16 wherein said means for moving said fibers comprises means for simultaneously moving all of said fibers into said bore while said guide tubes remain in fixed relationship with respect to said tube.

20. Apparatus in accordance with claim 16 wherein the second ends of said guide tubes are disposed in a geometrical array having a cross-sectional configuration different from said given cross-sectional configuration.

21. Apparatus in accordance with claim 16 further comprising means for inserting at least one optical fiber into the second end of said glass tube.

22. Apparatus in accordance with claim 16 further comprising a second plurality of guide tubes, each having first and second ends, means for retaining the first ends of said second plurality of guide tubes in side-by-side fashion in said given geometrical array, means for positioning the first ends of said second plurality of guide tubes adjacent said second end of said glass tube so that said tube array is sufficiently aligned with said bore longitudinal axis that fibers extending from the first ends of said second plurality of guide tubes enter said bore.

23. Apparatus in accordance with claim 16 further comprising means affixed to the second ends of said guide tubes for injecting a volatile lubricating liquid into said bore.

24. Apparatus in accordance with claim 23 wherein the first ends of said guide tubes are located in retaining tube and wherein said means for injecting lubricating liquid is situated in said retaining tube.

25. Apparatus in accordance with claim 16 wherein said tube clamp means comprises first and second chucks which grip said glass tube at longitudinal positions near the first and second ends of said glass tube.

* * * * *